United States Patent
Murai et al.

(10) Patent No.: US 12,133,102 B2
(45) Date of Patent: Oct. 29, 2024

(54) WIRELESS COMMUNICATION SYSTEM FOR MONITORING CONDITIONS AND POSITION OF SLAVE APPARATUS

(71) Applicant: OMRON Corporation, Kyoto (JP)

(72) Inventors: Akito Murai, Kyoto (JP); Kentaro Hamana, Kyoto (JP); Manh Tai Nguyen, Kyoto (JP); Yoshiki Sugimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 333 days.

(21) Appl. No.: 17/625,812

(22) PCT Filed: Jul. 19, 2019

(86) PCT No.: PCT/JP2019/028468
§ 371 (c)(1),
(2) Date: Jan. 10, 2022

(87) PCT Pub. No.: WO2021/014494
PCT Pub. Date: Jan. 28, 2021

(65) Prior Publication Data
US 2022/0248242 A1 Aug. 4, 2022

(51) Int. Cl.
*H04W 24/08* (2009.01)
*H04L 41/0604* (2022.01)
(Continued)

(52) U.S. Cl.
CPC ......... *H04W 24/08* (2013.01); *H04L 41/0618* (2013.01); *H04W 4/38* (2018.02); *H04W 84/20* (2013.01)

(58) Field of Classification Search
CPC ..... H04W 24/00; H04W 24/08; H04W 84/00; H04W 84/18; H04W 84/20;
(Continued)

(56) References Cited

U.S. PATENT DOCUMENTS

| 9,086,283 B2* | 7/2015 | Park ................. G01C 21/12 |
| 2010/0245054 A1* | 9/2010 | Kim ................. G06K 7/10336 |
| | | 455/41.1 |

(Continued)

FOREIGN PATENT DOCUMENTS

| EP | 3410617 A1 | 12/2018 |
| JP | 2000194968 A | 7/2000 |

(Continued)

OTHER PUBLICATIONS

EPO Extended European Search Report for corresponding EP Application No. 19938247.4; Issued on Mar. 27, 2023.

(Continued)

*Primary Examiner* — Warner Wong
(74) *Attorney, Agent, or Firm* — CANTOR COLBURN LLP

(57) ABSTRACT

A wireless communication apparatus is provided with: a signal receiving circuit configured to wirelessly receive a measurement value of a sensor from a slave apparatus; a position estimator configured to estimate a position of the slave apparatus; a storage device configured to store a history of the position of the slave apparatus; and a master control circuit configured to display the measurement value of the sensor and the position of the slave apparatus on a display device. When the master control circuit fails to receive the measurement value of the sensor from the slave apparatus, the master control circuit displays, on the display device, a latest position stored in the storage device, together with an error message indicating that communication between the wireless communication apparatus and the slave apparatus is interrupted.

6 Claims, 14 Drawing Sheets

(51) Int. Cl.
*H04W 4/38* (2018.01)
*H04W 84/20* (2009.01)

(58) Field of Classification Search
CPC ... H04W 52/0225; H04W 24/10; H04W 4/02;
H04W 4/38; H04L 43/00; H04L 43/02;
H04L 43/04; H04L 43/045; H04L 43/065;
H04L 43/08; H04L 51/21; H04L 51/216;
H04L 51/222; H04L 67/12; H04L 67/25;
H04L 47/822; H04L 1/00; H04L 41/06;
H04L 41/0604; H04L 41/0618
See application file for complete search history.

(56) References Cited

U.S. PATENT DOCUMENTS

| | | | |
|---|---|---|---|
| 2014/0258527 A1 | 9/2014 | Takenaka | |
| 2016/0342496 A1* | 11/2016 | Cahill | G06F 11/3013 |
| 2017/0013330 A1* | 1/2017 | Yamamoto | H04Q 9/00 |
| 2017/0095839 A1* | 4/2017 | Gluch | B07C 3/006 |
| 2018/0351789 A1* | 12/2018 | Ohmae | H04B 7/14 |
| 2019/0097469 A1* | 3/2019 | Watanabe | H02J 50/80 |
| 2019/0199136 A1 | 6/2019 | Choi et al. | |
| 2020/0076713 A1* | 3/2020 | Meyer | H04L 69/22 |

FOREIGN PATENT DOCUMENTS

| | | |
|---|---|---|
| JP | 2008121911 A | 5/2008 |
| JP | 201398926 A | 5/2013 |
| JP | 2017220808 A | 12/2017 |
| WO | 2016139845 A1 | 9/2016 |

OTHER PUBLICATIONS

International Search Report for International Application No. PCT/JP2019/028468; Date of Mailing; Oct. 8, 2019.
PCT Written Opinion of the International Searching Authority for International Application No. PCT/JP2019/028468; Date of Mailing; Oct. 8, 2019.

* cited by examiner

WIRELESS COMMUNICATION SYSTEM FOR MONITORING CONDITIONS AND POSITION OF SLAVE APPARATUS

CROSS REFERENCE TO RELATED APPLICATIONS

This is the U.S. national stage of application No. PCT/JP2019/028468, filed on Jul. 19, 2019. The entire content of which is incorporated herein by reference.

TECHNICAL FIELD

The present disclosure relates to a wireless communication apparatus operable as a master apparatus for a wireless communication system including the master apparatus and at least one slave apparatus, and also relates to a wireless communication system including such a wireless communication apparatus.

BACKGROUND ART

A sensor network including a plurality of sensors arranged at various positions may be constructed using a wireless communication system including a plurality of slave apparatuses each having a sensor, and a master apparatus wirelessly communicatively coupled to the slave apparatuses. Each of the sensors obtains a measurement value of a predetermined physical quantity, and the master apparatus reads the sensor's measurement value from each of the slave apparatuses.

For example, Patent Document 1 discloses a network system including a plurality of node apparatuses, and sensor apparatuses connected to the node apparatuses via wireless or wired communication, and a method for transmitting and receiving sensor data.

CITATION LIST

Patent Documents

PATENT DOCUMENT 1: Japanese Patent Laid-open Publication No. JP 2013-098926 A

SUMMARY OF INVENTION

Technical Problem

In such a wireless communication system, the master apparatus may fail to obtain a certain sensor's measurement value due to some failure. Such an event may occur due to the sensor's failure, and may also occur due to an interruption in communication between the master apparatus and the slave apparatus. Therefore, it takes time and effort to specify a target to be repaired. In addition, the position of the slave apparatus is not always known. In this case, it takes time and effort to specify the position of the slave apparatus (sensor) to be repaired. Therefore, it is required to appropriately monitor conditions and position of the slave apparatus to reduce burdens of maintenance and repair.

An object of the present disclosure is to provide a wireless communication apparatus capable of appropriately monitoring conditions and position of a slave apparatus to reduce burdens of maintenance and repair. In addition, another object of the present disclosure is to provide a wireless communication system including such a wireless communication apparatus.

Solution to Problem

According to an aspect of the present disclosure, a wireless communication apparatus is operable as a master apparatus for a wireless communication system including the master apparatus and at least one slave apparatus. The slave apparatus is provided with a sensor configured to obtain a measurement value of a predetermined physical quantity, and the slave apparatus wirelessly transmits the measurement value of the sensor to the wireless communication apparatus. The wireless communication apparatus is provided with: a signal receiving circuit configured to wirelessly receive the measurement value of the sensor from the slave apparatus; a position estimator configured to estimate a position of the slave apparatus; a storage device configured to store a history of the position of the slave apparatus; and a master control circuit configured to display the measurement value of the sensor and the position of the slave apparatus on a display device. When the master control circuit fails to receive the measurement value of the sensor from the slave apparatus, the master control circuit displays, on the display device, a latest position stored in the storage device, together with an error message indicating that communication between the wireless communication apparatus and the slave apparatus is interrupted.

With this configuration, even if the current position of the slave apparatus is unknown due to the interruption of the communication, it is possible to provide a user with the position where the slave apparatus is considered to reside. Therefore, it is possible to appropriately monitor the conditions and position of the slave apparatus to reduce burdens of maintenance and repair.

According to an aspect of the present disclosure, the storage device stores a history of the measurement value of the sensor. When the measurement value of the sensor is unchanged for a predetermined time period, the master control circuit displays, on the display device, an error message indicating that malfunction of the sensor has occurred.

With this configuration, it can be seen that although the master apparatus and the slave apparatus can communicate with each other, the sensor cannot obtain the measurement value due to malfunction of the sensor.

According to an aspect of the present disclosure, the wireless communication apparatus is further provided with a power transmitting circuit configured to wirelessly transmit power to the slave apparatus. The slave apparatus is provided with a rechargeable battery configured to store the power wirelessly transmitted from the wireless communication apparatus, and the slave apparatus measures a state of charge of the rechargeable battery, and wirelessly transmits the state of charge to the wireless communication apparatus. The signal receiving circuit wirelessly receives the state of charge of the rechargeable battery from the slave apparatus. When the state of charge of the rechargeable battery is smaller than a predetermined threshold, the master control circuit displays, on the display device, an error message indicating that the state of charge of the rechargeable battery is low.

With this configuration, it can be seen that although the master apparatus and the slave apparatus can communicate with each other, the sensor cannot obtain the measurement value due to shortage of the state of charge.

According to an aspect of the present disclosure, a wireless communication apparatus is operable as a master apparatus for a wireless communication system including the master apparatus and at least one slave apparatus. The slave apparatus is provided with a rechargeable battery storing power wirelessly transmitted from the wireless communication apparatus, measures a state of charge of the rechargeable battery, and wirelessly transmits the state of charge to the wireless communication apparatus. The slave apparatus is provided with a sensor configured to obtain a measurement value of a predetermined physical quantity, and the slave apparatus wirelessly transmits the measurement value of the sensor to the wireless communication apparatus. The wireless communication apparatus is provided with: a power transmitting circuit configured to wirelessly transmit power to the slave apparatus; a signal receiving circuit configured to wirelessly receive the state of charge of the rechargeable battery, and the measurement value of the sensor, from the slave apparatus; a position estimator configured to estimate a position of the slave apparatus; a storage device configured to store a history of the measurement value of the sensor; and a master control circuit configured to display the measurement value of the sensor, and the position of the slave apparatus, on a display device. When the state of charge of the rechargeable battery is smaller than a predetermined threshold, the master control circuit displays, on the display device, an error message indicating that the state of charge of the rechargeable battery is low. When the measurement value of the sensor is unchanged for a predetermined time period, the master control circuit displays, on the display device, an error message indicating that malfunction of the sensor has occurred.

With this configuration, it can be seen that although the master apparatus and the slave apparatus can communicate with each other, the sensor cannot obtain the measurement value due to other failures (shortage of state of charge, or malfunction of the sensor). Therefore, it is possible to appropriately monitor the conditions and position of the slave apparatus to reduce burdens of maintenance and repair.

According to an aspect of the present disclosure, the position estimator is provided with: an antenna device having variable directivity; and a signal level monitor configured to measure a signal level of a signal wirelessly received from the slave apparatus.

With this configuration, it is possible to estimate the direction of the slave apparatus as seen from the master apparatus, and estimate the distance between the master apparatus and the slave apparatus, According to an aspect of the present disclosure, a wireless communication system includes: the wireless communication apparatus as mentioned above; and at least one slave apparatus.

With this configuration, it is possible to appropriately monitor the conditions and position of the slave apparatus to reduce burdens of maintenance and repair.

According to an aspect of the present disclosure, the wireless communication system further includes a control apparatus provided with a display device. The wireless communication apparatus is communicatively coupled to the control apparatus.

With this configuration, it is possible to display the conditions and position of the slave apparatus in association with each other ADVANTAGEOUS EFFECTS OF INVENTION According to the wireless communication apparatus and the wireless communication system according to the aspects of the present disclosure, it is possible to appropriately monitor the conditions and position of the slave apparatus to reduce the burdens of maintenance and repair.

DESCRIPTION OF EMBODIMENTS

Figure 1:
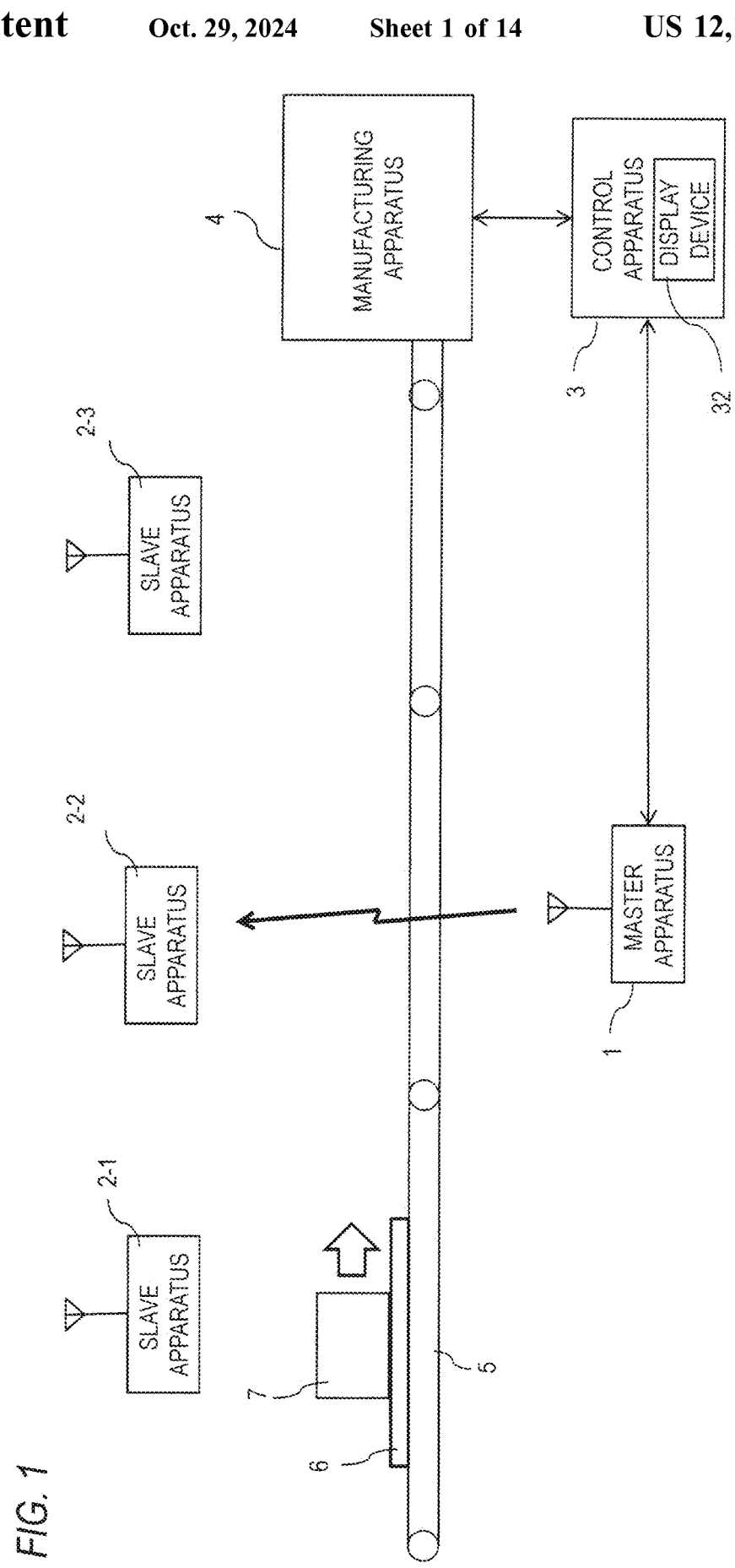
FIG. 1 is a block diagram illustrating a manufacturing system including a wireless communication system according to a first embodiment.

Hereinafter, embodiments according to one aspect of the present disclosure (hereinafter, also referred to as "the present embodiments") will be described with reference to the drawings. In the drawings, the same reference sign indicates similar components.

Application Example

FIG. 1 is a block diagram illustrating a manufacturing system including a wireless communication system according to a first embodiment. The wireless communication system of FIG. 1 includes a master apparatus 1, and at least one slave apparatus, in the example in FIG. 1, three slave apparatuses 2-1 to 2-3.

In the present specification, the slave apparatuses 2-1 to 2-3 are collectively referred to as "slave apparatuses 2".

As will be described later, each of the slave apparatuses 2 is provided with a sensor 23 configured to obtain a measurement value of a predetermined physical quantity, and wirelessly transmits the measurement value of the sensor 23 to the master apparatus 1.

Figure 2:
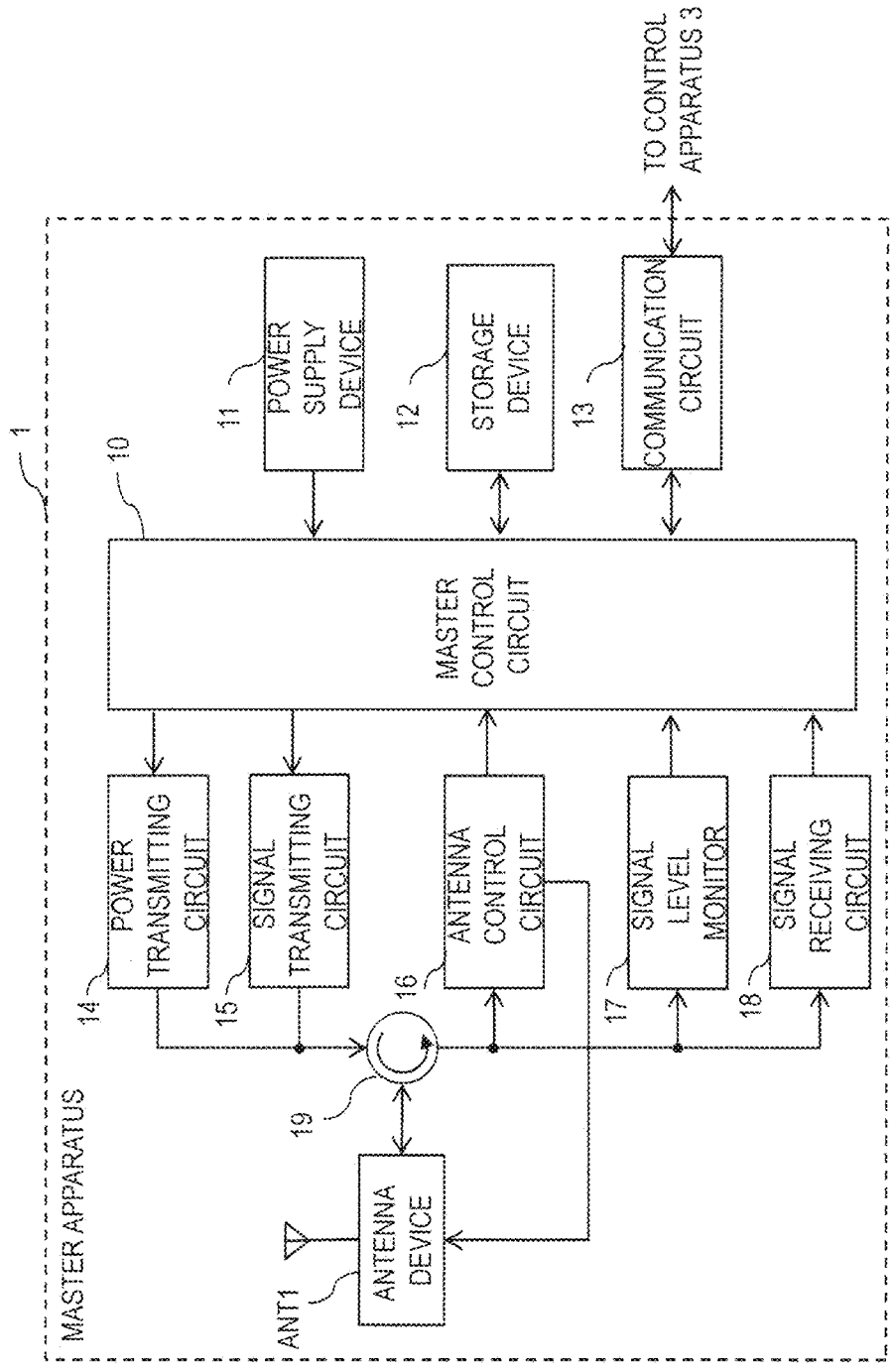
FIG. 2 is a block diagram illustrating a configuration of a master apparatus 1 of FIG. 1.

FIG. 2 is a block diagram illustrating a configuration of the master apparatus 1 of FIG. 1. The master apparatus 1 is provided with at least a master control circuit 10, a storage device 12, a signal level monitor 17, a signal receiving circuit 18, and an antenna device ANT1. The signal receiving circuit 18 wirelessly receives the measurement value of the sensor 23 from the slave apparatus 2 via the antenna device ANT1. The antenna device ANT1 and the signal level monitor 17 function as a position estimator configured to estimate the position of the slave apparatus 2 based on the signal received from the slave apparatus 2. The storage device 12 stores a history of the position of the slave apparatus 2 estimated using the antenna device ANT1 and the signal level monitor 17. The master control circuit 10 displays the measurement value of the sensor 23, and the position of the slave apparatus 2, on a display device 32. The display device 32 may be provided in a control apparatus 3 external to the master apparatus 1, for example, as illustrated in FIG. 1.

Figure 4:
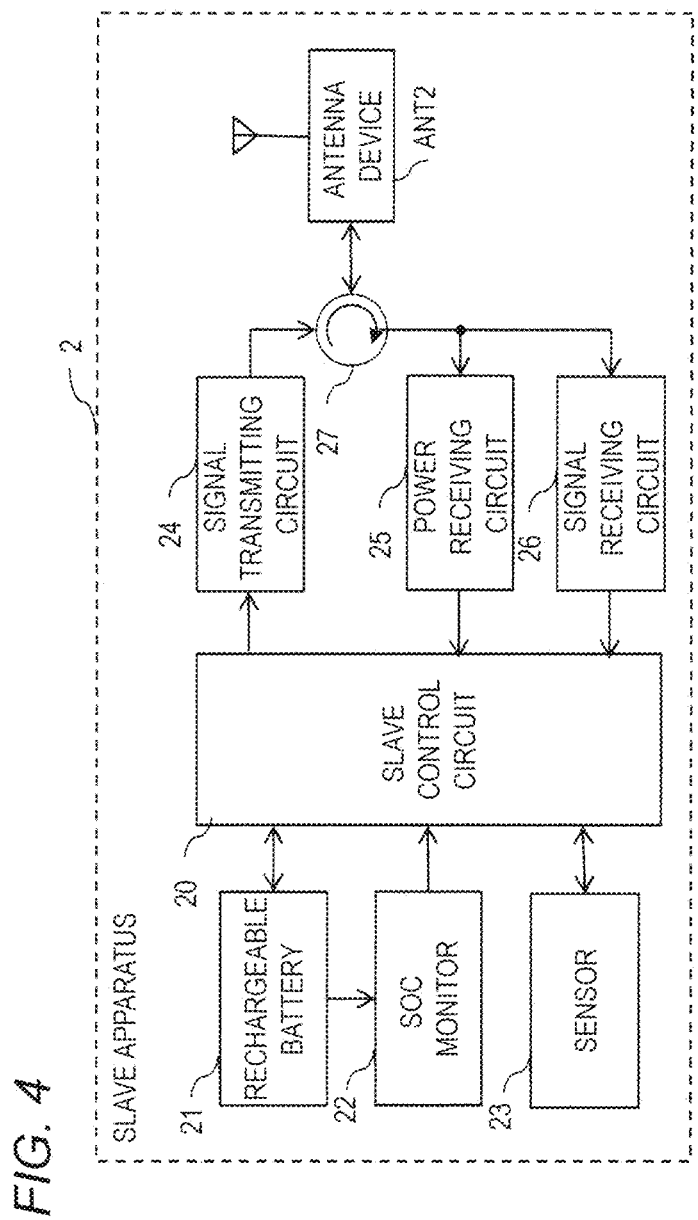
FIG. 4 is a block diagram illustrating a configuration of a slave apparatus 2 of FIG. 1.

FIG. 4 is a block diagram illustrating a configuration of the slave apparatus 2 of FIG. 1. The slave apparatus 2 is provided with at least the sensor 23, a signal transmitting circuit 24, and an antenna device ANT2. As described above, the sensor 23 obtains the measurement value of the predetermined physical quantity. The signal transmitting circuit 24 wirelessly transmits the measurement value of the sensor 23 to the master apparatus 1 via the antenna device ANT2.

When the master control circuit 10 fails to receive the measurement value of the sensor 23 from the slave apparatus 2, the master control circuit 10 displays, on the display device 32, the latest position stored in the storage device 12, together with an error message indicating that the communication between the master apparatus 1 and the slave apparatus 2 is interrupted. As a result, even if the current position of the slave apparatus 2 is unknown due to the interruption of the communication, it is possible to provide a user with the position where the slave apparatus 2 is considered to reside. Therefore, it is possible to appropriately monitor the conditions and position of the slave apparatus 2 to reduce burdens of maintenance and repair 2.

Additionally or alternatively, the master apparatus 1 and the slave apparatus 2 may be configured and operate as follows.

As illustrated in FIG. 2, the master apparatus 1 may be additionally provided with a power transmitting circuit 14. The power transmitting circuit 14 wirelessly transmits power to the slave apparatus 2 via the antenna device ANT1.

As illustrated in FIG. 4, the slave apparatus 2 may be additionally provided with a power receiving circuit 25, a rechargeable battery 21, and a state-of-charge (SOC) monitor 22. The power receiving circuit 25 obtains power wirelessly transmitted from the master apparatus 1, via the antenna device ANT2. The rechargeable battery 21 stores the power wirelessly transmitted from the master apparatus 1. The state-of-charge monitor 22 measures a state of charge of the rechargeable battery 21. In addition, the signal transmitting circuit 24 of the slave apparatus 2 wirelessly transmits the state of charge of the rechargeable battery 21 to the master apparatus 1, as well as the measurement value of the sensor 23, via the antenna device ANT2.

The signal receiving circuit 18 of the master apparatus 1 wirelessly receives the state of charge of the rechargeable battery 21, as well as the measurement value of the sensor 23, from the slave apparatus 2, via the antenna device ANT1. The storage device 12 stores a history of the measurement value of the sensor 23, in addition to or instead of the history of the position of the slave apparatus 2.

As described above, in addition to or instead of displaying the error message indicating that the communication is interrupted, and the stored latest position, on the display device 32, the master control circuit 10 may operate as follows. When the state of charge of the rechargeable battery 21 is smaller than a predetermined threshold, the master control circuit 10 displays, on the display device 32, an error message indicating that the state of charge of the rechargeable battery 21 is low (i.e., insufficient). The threshold for the state of charge is set so that the rechargeable battery 21 can supply power not enough for the sensor 23 to operate, but enough for the slave control circuit 20 and the signal transmitting circuit 24 of the slave apparatus 2 to operate. The shortage of the state of charge may occur, for example, when the wireless power transmission from the master apparatus 1 to the slave apparatus 2 is interrupted, or when the rechargeable battery 21 and/or the power receiving circuit 25 are broken. Further, when the measurement value of the sensor 23 is unchanged for a predetermined time period, the master control circuit 10 displays, on the display device 32, an error message indicating that malfunction of the sensor 23 has occurred. The malfunction of the sensor 23 may occur, for example, when the sensor 23 is broken, or when the sensor 23 is not correctly installed (that is, when the sensor is installed at a position or in a posture in which the sensor cannot measure a target to be measured). As a result, it can be seen that although the master apparatus 1 and the slave apparatus 2 can communicate with each other, the sensor 23 cannot obtain the measurement value due to other failures (shortage of state of charge, or malfunction of the sensor 23). Even if the measurement value of the sensor 23 is unknown, it is possible to estimate the position of the slave apparatus 2 based on the signal received by the master apparatus 1 from the slave apparatus 2. Therefore, it is possible to appropriately monitor the conditions and position of the slave apparatus 2 to reduce burdens of maintenance and repair.

As described above, according to the wireless communication system of the embodiment, it is possible to appropriately monitor the conditions and position of the slave apparatus 2 to reduce the burdens of maintenance and repair.

First Embodiment

Configuration Example of First Embodiment

In the example in FIG. 1, the master apparatus 1 and the slave apparatuses 2-1 to 2-3 are provided in a factory including a control apparatus 3, a manufacturing apparatus 4, and a belt conveyor 5. The belt conveyor 5 conveys pallets 6 and workpieces 7. The pallets 6 and the workpieces 7 are moved by the belt conveyor 5 so as to arrive at predetermined positions at predetermined times. At each of the predetermined positions, a predetermined work event is performed on the workpiece 7. The slave apparatuses 2-1 to 2-3 are provided near the predetermined positions, respectively, and associated with the events performed at the predetermined positions, respectively. The sensors 23 of the slave apparatuses 2-1 to 2-3 measure predetermined physical quantities associated with these events. The master apparatus 1 collects the measured physical quantities from the slave apparatuses 2-1 to 2-3, and sends the physical quantities to the control apparatus 3. The control apparatus 3 controls operations of the manufacturing apparatus 4 based on the measured physical quantities. The control apparatus 3 is, for example, a programmable logic controller. The manufacturing apparatus 4 performs a predetermined work event (for example, a fabrication process, such as welding) on the workpieces 7.

Referring to FIG. 2, the master apparatus 1 is provided with the master control circuit 10, a power supply device 11, the storage device 12, a communication circuit 13, the power transmitting circuit 14, a signal transmitting circuit 15, an antenna control circuit 16, the signal level monitor 17, the signal receiving circuit 18, a circulator circuit 19, and an antenna device ANT1.

The master control circuit 10 controls overall operations of the master apparatus 1.

The power supply device 11 supplies power to be transmitted to the slave apparatus 2.

The storage device 12 stores the history of the measurement value of the sensor 23, and the history of the position of the slave apparatus 2, as described above.

The communication circuit 13 is connected to the control apparatus 3 via a wired or wireless communication line. The master control circuit 10 outputs the measurement value of the sensor 23, the position of the slave apparatus 2, and the error messages, to the control apparatus 3 via the communication circuit 13.

The power transmitting circuit 14 wirelessly transmits power to the slave apparatus 2 via the circulator circuit 19 and the antenna device ANT1, for operating the sensor 23 and the other circuits of the slave apparatus 2. The power transmitting circuit 14 generates, for example, a continuous wave (CW) from the power supplied by the power supply device 11.

The signal transmitting circuit 15 wirelessly transmits control signals for controlling the sensor 23 (for example, a read signal of the sensor 23) to the slave apparatus 2 via the circulator circuit 19 and the antenna device ANT1.

The antenna device ANT1 has variable directivity. The antenna control circuit 16 controls the directivity (directional pattern) of the antenna device ANT1 under the control of the master control circuit 10.

The signal level monitor 17 measures a signal level of a signal wirelessly received from the slave apparatus 2, for example, a received signal strength indicator (RSSI).

The signal receiving circuit 18 wirelessly receives a response signal from the slave apparatus 2 via the antenna device ANT1 and the circulator circuit 19, the response signal including the measurement value of the sensor 23, and the state of charge of the rechargeable battery 21.

The circulator circuit 19 combines and separates power and signals transmitted to the slave apparatus 2 via the antenna device ANT1, with/from signals received from the slave apparatus 2 via the antenna device ANT1.

Figure 3:
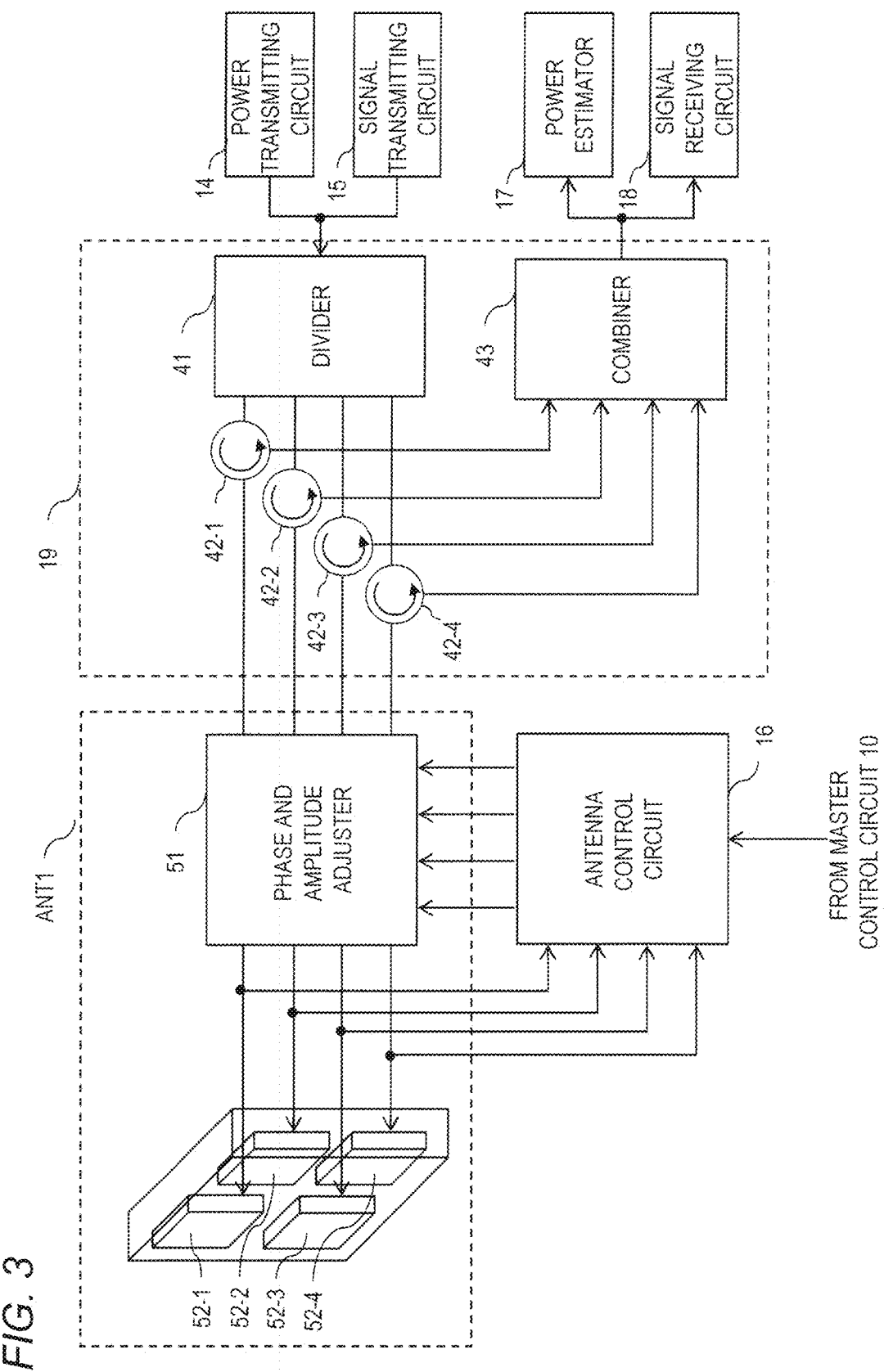
FIG. 3 is a block diagram illustrating a detailed configuration of a circulator circuit 19 and an antenna device ANT1 of FIG. 2.

FIG. 3 is a block diagram illustrating a detailed configuration of the circulator circuit 19 and the antenna device ANT1 of FIG. 2. The antenna device ANT1 may be, for example, an array antenna including a plurality of antenna elements.

The circulator circuit 19 is provided with a divider 41, circulators 42-1 to 42-4, and a combiner 43. The divider 41 divides the power sent from the power transmitting circuit 14 into four in accordance with the number of antenna elements. Similarly, the divider 41 divides the signal sent from the signal transmitting circuit 15 into four in accordance with the number of antenna elements. The circulators 42-1 to 42-4 send the power and signals divided by the divider 41 to the antenna device ANT1, and send the four signals sent from the antenna device ANT1 to the combiner 43. The combiner 43 combines the four signals sent from the antenna device ANT1 with each other, and sends the combined signal to the signal level monitor 17 and the signal receiving circuit 18.

The antenna device ANT1 is provided with a phase and amplitude adjuster 51, and antenna elements 52-1 to 52-4. The antenna elements 52-1 to 52-4 are arranged at predetermined intervals. The phase and amplitude adjuster 51 adjusts phases and amplitudes of the signals transmitted and received via the antenna elements 52-1 to 52-4, under the control of the antenna control circuit 16, thus controlling the directions of a beam and a null of the antenna device ANT1.

Referring to FIG. 4, the slave apparatus 2 is provided with the slave control circuit 20, the rechargeable battery 21, the state-of-charge monitor 22, the sensor 23, the signal transmitting circuit 24, the power receiving circuit 25, a signal receiving circuit 26, a circulator circuit 27, and the antenna device ANT2.

The slave control circuit 20 controls overall operations of the slave apparatus 2.

The rechargeable battery 21 stores the power wirelessly transmitted from the master apparatus 1, as described above.

The state-of-charge monitor 22 measures the state of charge of the rechargeable battery 21, as described above. The state-of-charge monitor 22 measures the state of charge of the rechargeable battery 21, for example, based on a charged voltage of the rechargeable battery 21.

The sensor 23 obtains the measurement value of the predetermined physical quantity, as described above. The sensor 23 may measure any of physical quantities, for example, such as temperature, light, displacement, vibration, pressure, flow rate, inclination, and the like. In addition, the sensor 23 may detect a state of a target, for example, ON/OFF of a switch or apparatus, by obtaining a measurement value of a predetermined physical quantity.

The signal transmitting circuit 24 wirelessly transmits a response signal to the master apparatus 1 via the circulator circuit 27 and the antenna device ANT2. the response signal including the measurement value of the sensor 23, and the state of charge of the rechargeable battery 21.

The power receiving circuit 25 obtains power wirelessly transmitted from the master apparatus 1, via the antenna device ANT2 and the circulator circuit 27.

The signal receiving circuit 26 wirelessly receives control signals including a read signal of the sensor 23 and the like, from the master apparatus 1, via the antenna device ANT2 and the circulator circuit 27.

The antenna device ANT2 has a predetermined directional pattern or omni-directional pattern.

The circulator circuit 27 combines and separates power and signals transmitted from the master apparatus 1 via the antenna device ANT2, with/from signals transmitted to the master apparatus 1 via the antenna device ANT2.

Figure 5:
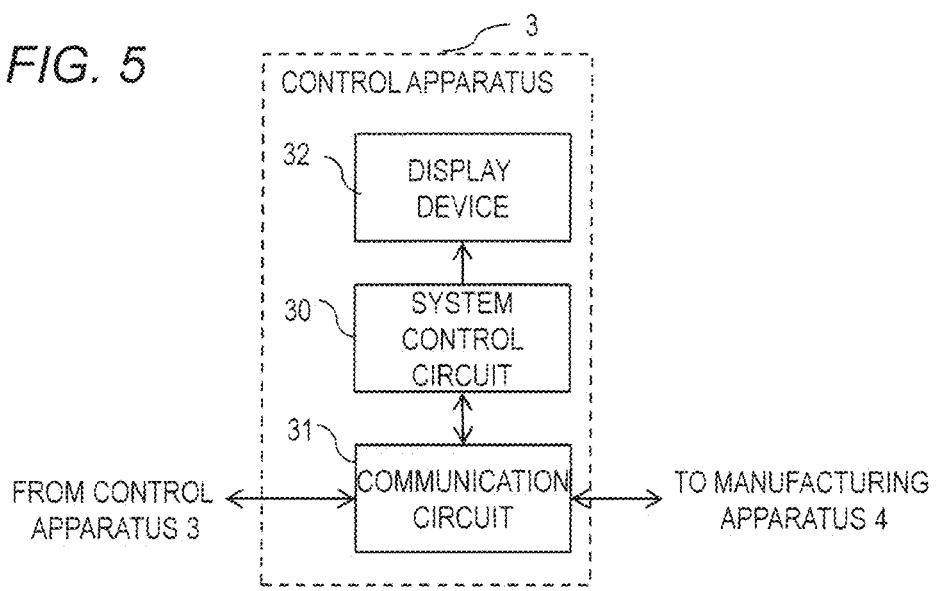
FIG. 5 is a block diagram illustrating a configuration of a control apparatus 3 of FIG. 1.

FIG. 5 is a block diagram illustrating a configuration of the control apparatus 3 of FIG. 1. The control apparatus 3 is provided with a system control circuit 30, a communication circuit 31, and a display device 32.

The system control circuit 30 controls overall operations of the control apparatus 3, and controls overall operations of the manufacturing system of FIG. 1.

The communication circuit 31 is connected to the master apparatus 1 via a wired or wireless communication line. In addition, the communication circuit 31 is connected to the manufacturing apparatus 4 via a wired or wireless communication line. The system control circuit 30 sends a read request signal for requesting reading of the measurement value of the sensor 23, to the master apparatus 1 via the communication circuit 31. In addition, the system control circuit 30 receives the measurement value of the sensor 23, the position of the slave apparatus 2, and the error messages, from the master apparatus 1 via the communication circuit 31. In addition, the system control circuit 30 sends a control signal for controlling operations of the manufacturing apparatus 4, to the manufacturing apparatus 4 via the communication circuit 31.

The display device 32 displays a state of the manufacturing system of FIG. 1, for example, data received from the master apparatus 1, that is, the measurement value of the sensor 23, the position of the slave apparatus 2, and the error messages. The display device 32 may be integrated with the control apparatus 3, or may be connected externally to the control apparatus 3.

Operation Example of First Embodiment

Figure 6:
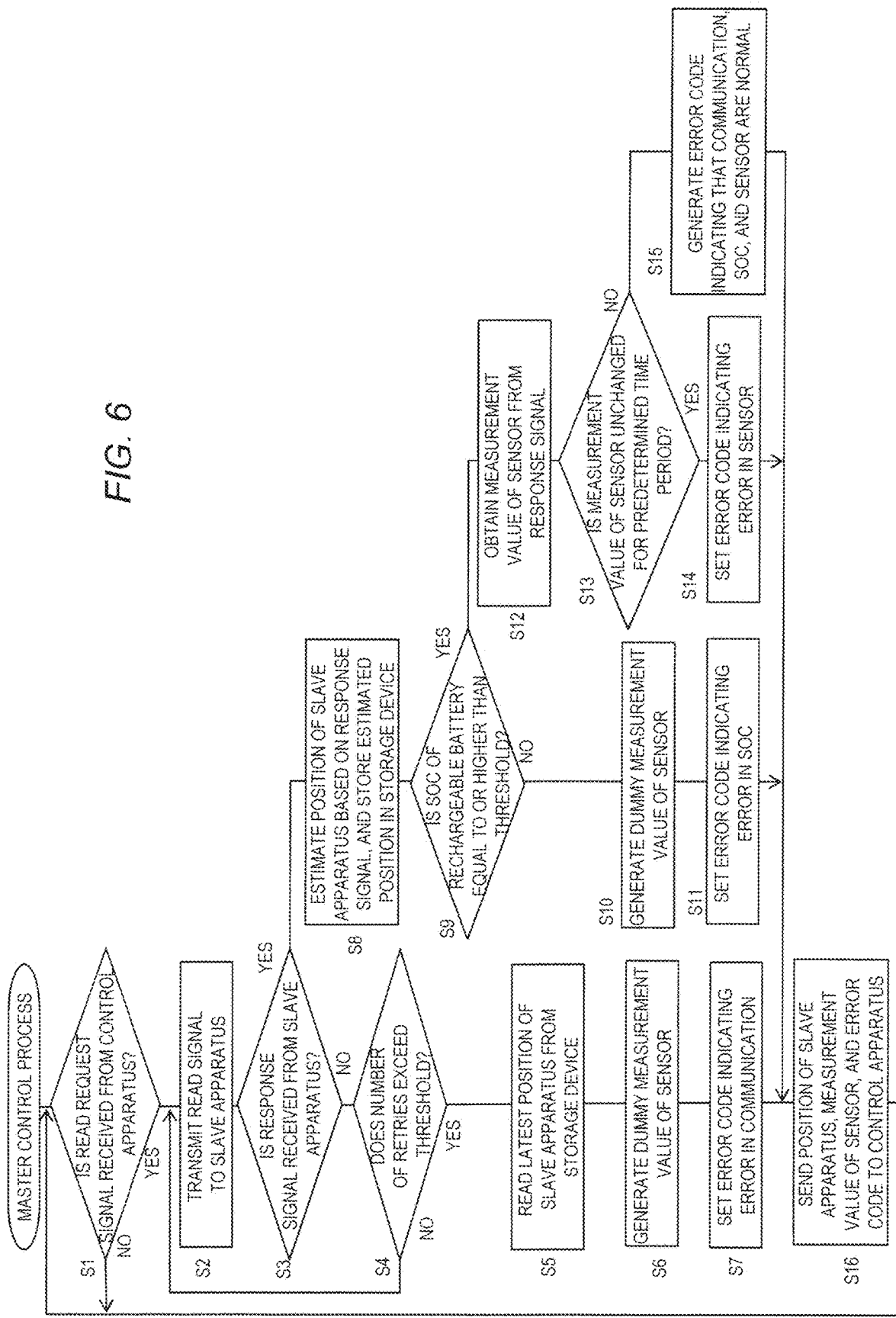
FIG. 6 is a flowchart illustrating a master control process executed by a master control circuit 10 of FIG. 2.

FIG. 6 is a flowchart illustrating a master control process executed by the master control circuit 10 of FIG. 2.

In step S1, the master control circuit 10 determines whether or not a read request signal is received from the control apparatus 3; if YES, the process proceeds to step S2, and if NO, the process repeats to step S1.

In step S2, the master control circuit 10 transmits a read signal to the slave apparatus 2 for obtaining the measurement value of the sensor 23.

Figure 7:
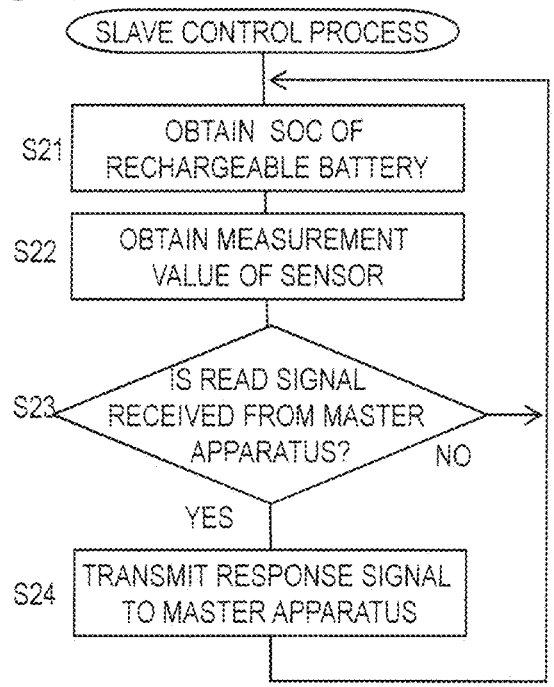
FIG. 7 is a flowchart illustrating a slave control process executed by a slave control circuit 20 of FIG. 4.

FIG. 7 is a flowchart illustrating a slave control process executed by the slave control circuit 20 of FIG. 4. In step S21, the slave control circuit 20 obtains the state of charge of the rechargeable battery 21 using the state-of-charge monitor 22. In step S22, the slave control circuit 20 obtains the measurement value of the sensor 23. In step S23, the slave control circuit 20 determines whether or not the read signal is received from the master apparatus 1; if YES, the process proceeds to step S24, and if NO, the process returns to step S21. In step S24, the slave control circuit 20 transmits a response signal including the measurement value of the sensor 23 and the state of charge of the rechargeable battery 21, to the master apparatus 1.

Referring again to FIG. 6, in step S3, the master control circuit 10 determines whether or not the response signal is received from the slave apparatus 2; if YES, the process proceeds to step S8, and if NO, the process proceeds to step S4.

The master control circuit 10 repeats steps S2 to S4 until receiving the response signal to the read signal transmitted in step S2. In step S4, the master control circuit 10 determines whether or not the number of consecutive retries of steps S2 to S4 exceeds a predetermined threshold; if YES, the process proceeds to step S5, and if NO, the process returns to step S2.

In step S5, the master control circuit 10 reads the latest position of the slave apparatus 2 from the storage device 12. In this case, the position of the slave apparatus 2 read from the storage device 12 is the past position of the slave apparatus 2 estimated when the response signal is received from the slave apparatus 2. In addition, since the response signal is not received from the slave apparatus 2, the measurement value of the sensor 23 is unknown. Therefore, in step S6, the master control circuit 10 generates a dummy measurement value of the sensor 23. In step S7, the master control circuit 10 sets an error code indicating an error in communication between the master apparatus 1 and the slave apparatus 2.

In step S8, the master control circuit 10 estimates the position of the slave apparatus 2 based on the response signal received from the slave apparatus 2, and stores the estimated position in the storage device 12. The position of the slave apparatus 2 is estimated using the antenna device ANT1 and the signal level monitor 17, as described above.

Figure 9:
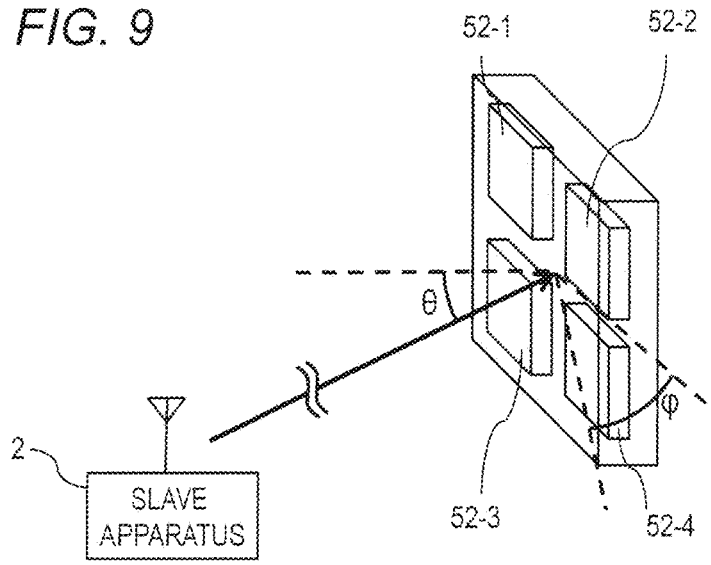
FIG. 9 is a diagram for explaining estimation of a direction of the slave apparatus 2 as seen from the master apparatus 1 of FIG. 1.

FIG. 9 is a diagram for explaining estimation of the direction of the slave apparatus 2 as seen from the master apparatus 1 of FIG. 1. By steering the beam of the antenna device ANT1 to the slave apparatus 2, it is possible to estimate the direction of the slave apparatus 2 as seen from the master apparatus 1. As illustrated in FIG. 9, it is possible to estimate at least one of the incident angle θ and the azimuth angle φ of the signal arriving from the slave apparatus 2 to the master apparatus 1, depending on the structure of the antenna device ANT1 (for example, the arrangement of the antenna elements 52-1 to 52-4). Any algorithm can be used to steer the beam of the antenna device ANT1.

Figure 10:
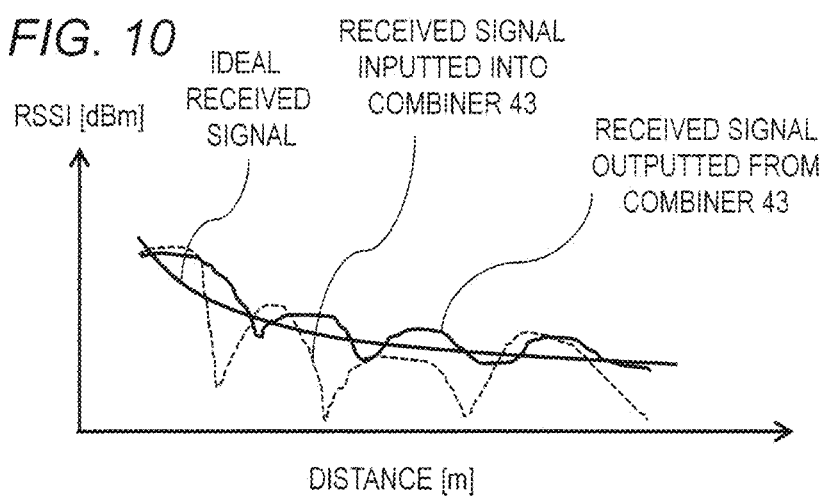
FIG. 10 is a diagram for explaining estimation of a distance between the master apparatus 1 and the slave apparatus 2 of FIG. 1.

FIG. 10 is a diagram for explaining estimation of a distance between the master apparatus 1 and the slave apparatus 2 of FIG. 1. In general, the signal level of a signal wirelessly received by the master apparatus 1 from the slave apparatus 2 decreases as the distance between the master apparatus 1 and the slave apparatus 2 increases, and increases as the distance decreases. Therefore, it is possible to estimate the distance between the master apparatus 1 and the slave apparatus 2, by using the signal level monitor 17 to measure the signal level (for example, RSSI) of the signal wirelessly received from the slave apparatus 2. In this case, as illustrated in FIG. 10, the signal level of an individual received signal arrived at each of the antenna elements 52-1 to 52-4, before being inputted to the combiner 43, may be affected by multipath, and therefore, largely differ from an ideal signal level. On the other hand, by combining these received signals using the combiner 43, it is possible to reduce the influence of the multipath, and make the received signals close to ideal received signals. Therefore, by estimating the distance between the master apparatus 1 and the slave apparatus 2 based on the signal level of the received signal outputted from the combiner 43, is possible to estimate the distance with a smaller error than that of estimation based on the signal levels of the received signals to be inputted to the combiner 43.

The antenna device ANT1 and the antenna control circuit 16 are calibrated in advance so that the direction of the slave apparatus 2 as seen from the master apparatus 1 can be estimated. In addition, the signal level monitor 17 is calibrated in advance so that the distance between the master apparatus 1 and the slave apparatus 2 can be estimated.

Using the method as described with reference to FIGS. 9 and 10, it is possible to estimate the relative position of the slave apparatus 2 as seen from the master apparatus 1. If the absolute position of the master apparatus 1 is known, it is possible to estimate the absolute position of the slave apparatus 2.

Referring again to FIG. 6, in step S9, the master control circuit 10 determines whether or not the state of charge of the rechargeable battery 21 is equal to or higher than a predetermined threshold; if YES, the process proceeds to step S12, and if NO, the process proceeds to step S10. As described above, the threshold for the state of charge is set so that the rechargeable battery 21 can supply power not enough for the sensor 23 to operate, but enough for the slave control circuit 20 and the signal transmitting circuit 24 of the slave apparatus 2 to operate.

If step S9 is NO, since the sensor 23 cannot correctly operate due to the shortage of the state of charge, a correct measurement value of the sensor 23 cannot be obtained. Therefore, in step S10, the master control circuit 10 generates a dummy measurement value of the sensor 23. In step S11, the master control circuit 10 sets an error code indicating a state-of-charge error.

In step S12, the master control circuit 10 obtains the measurement value of the sensor 23 from the response signal. In step S13, the master control circuit 10 determines whether or not the measurement value of the sensor 23 is unchanged for a predetermined time period; if YES, the process proceeds to step S14, and if NO, the process proceeds to step S15. In this case, the time period of step S13 may be set to a predetermined time length, or may be set as the number of iterations of the master control process.

In step S14, the master control circuit 10 sets an error code indicating an error of the sensor 23.

In step S15, the master control circuit 10 generates an error code indicating that the communication, the state of charge, and the sensor 23 are normal (that is, there is no error).

In step S16, the master control circuit 10 sends the position of the slave apparatus 2, the measurement value of the sensor 23, and the error code, to the control apparatus 3. Thereafter, the process returns to step S1.

Figure 8:
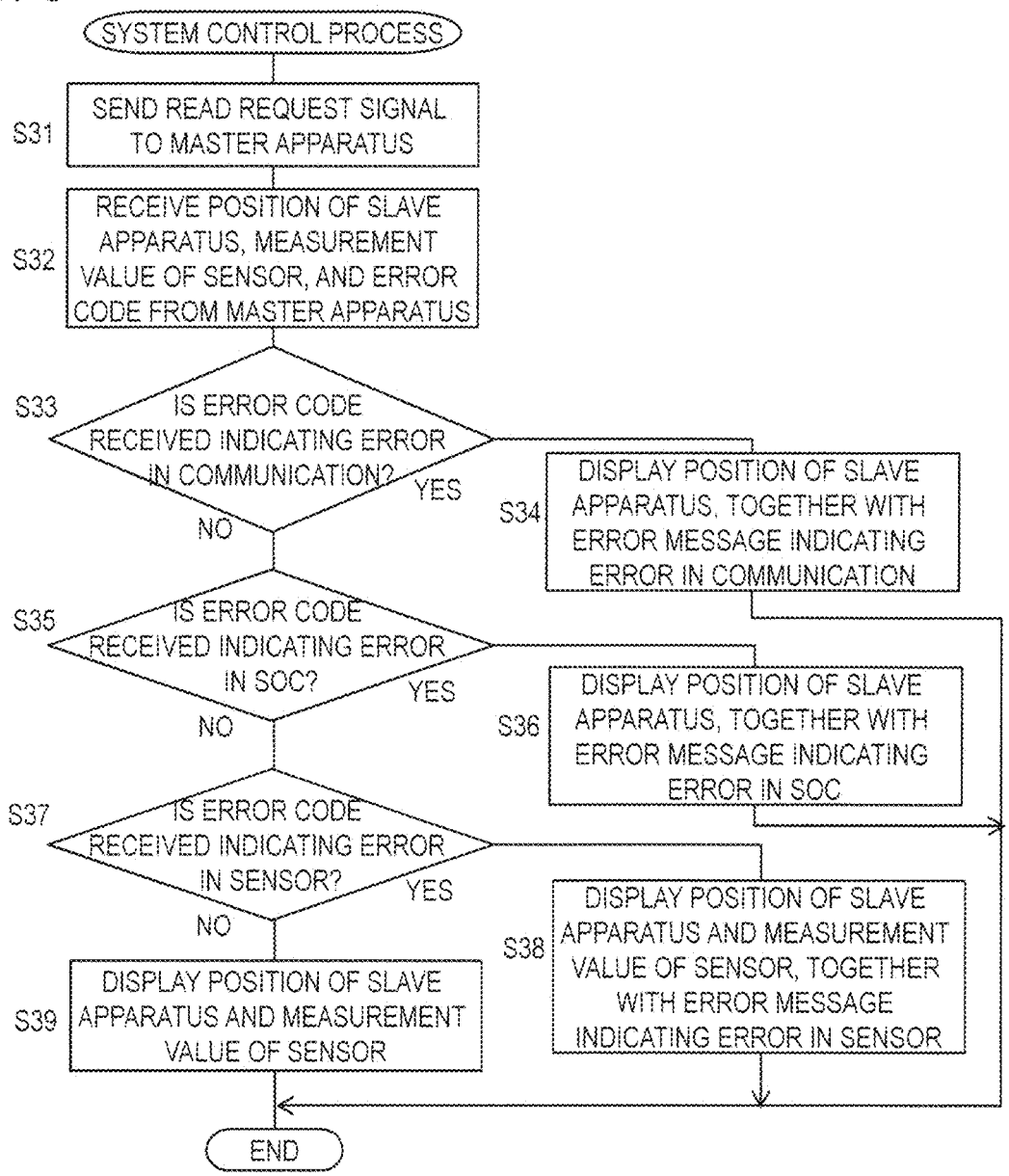
FIG. 8 is a flowchart illustrating a system control process executed by a system control circuit 30 of FIG. 5.

FIG. 8 is a flowchart illustrating a system control process executed by the system control circuit 30 of FIG. 5.

In step S31, the system control circuit 30 sends a read request signal to the master apparatus 1. In step S32, the system control circuit 30 receives the position of the slave apparatus 2, the measurement value of the sensor 23, and the error code, from the master apparatus 1.

In step S33, the system control circuit 30 determines whether or not an error code indicating a communication error is received; if YES, the process proceeds to step S34, and if NO, the process proceeds to step S35. In step S34, the system control circuit 30 displays the position of the slave apparatus 2, together with an error message indicating a communication error, on the display device 32.

Figure 11:
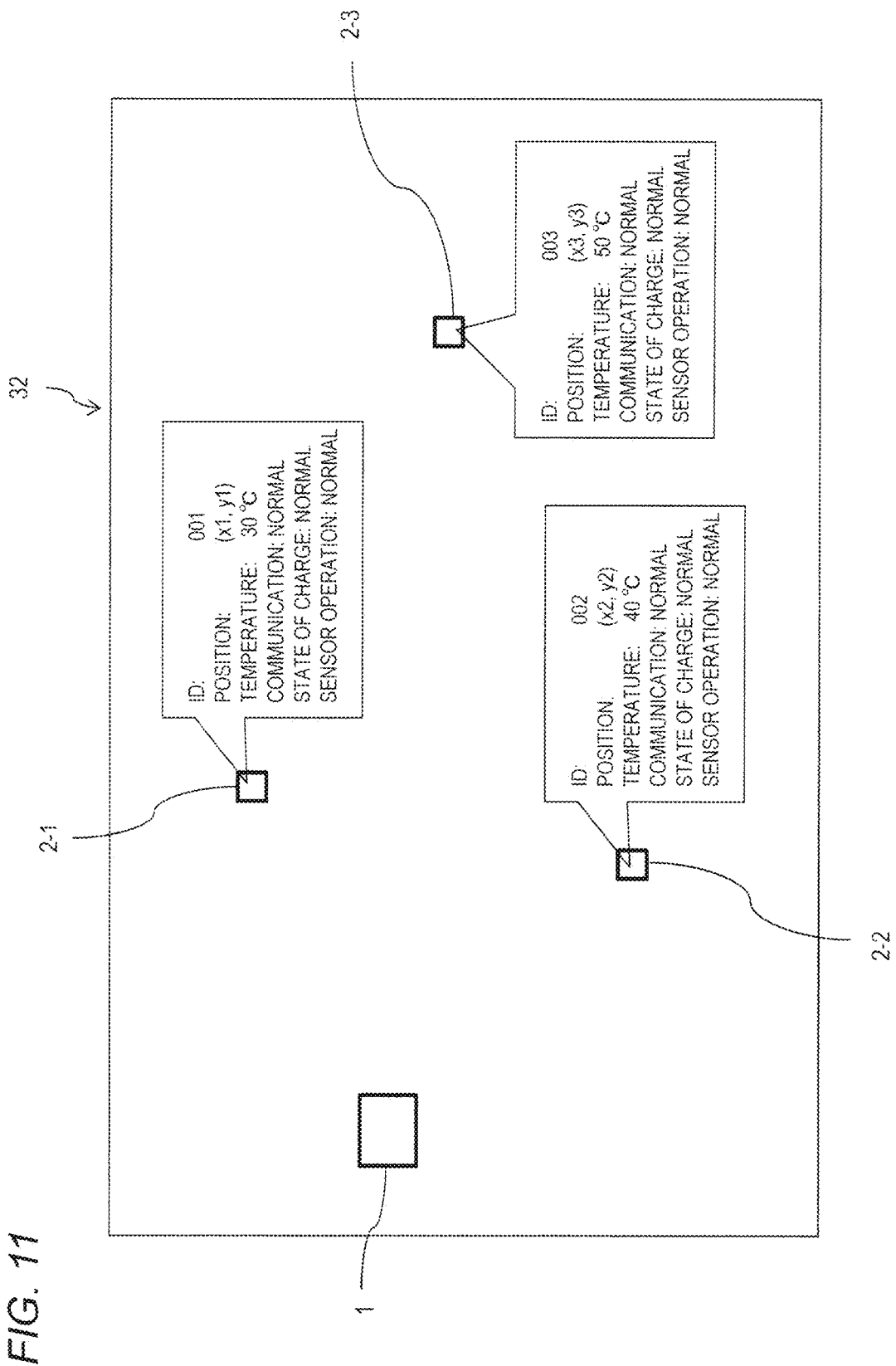
FIG. 11 is a diagram illustrating exemplary arrangement of the master apparatus 1 and slave apparatuses 2-1 to 2-3 displayed on a display device 32 of FIG. 1, in which all the slave apparatuses 2-1 to 2-3 are normal.

FIG. 11 is a diagram illustrating exemplary arrangement of the master apparatus 1 and the slave apparatuses 2-1 to 2-3 displayed on the display device 32 of FIG. 1, in which all the slave apparatuses 2-1 to 2-3 are normal. In the examples of FIGS. 11 to 14, an identifier (ID), a position, a measurement value of the sensor 23 (for example, temperature), a state of communication, a state of charge, and a state of the operation of the sensor 23 are displayed in association with each of the slave apparatuses 2-1 to 2-3.

The system control circuit 30 may display a map of a place where the wireless communication system is installed, and overlay the position of the master apparatus 1, and the estimated positions of the slave apparatuses 2, on the map. The system control circuit 30 may store the absolute position of the master apparatus 1 in advance. In this case, it is possible to estimate the absolute positions of the slave apparatuses 2 based on the absolute position of the master apparatus 1, and the estimated relative positions of the slave apparatuses 2.

Figure 12:
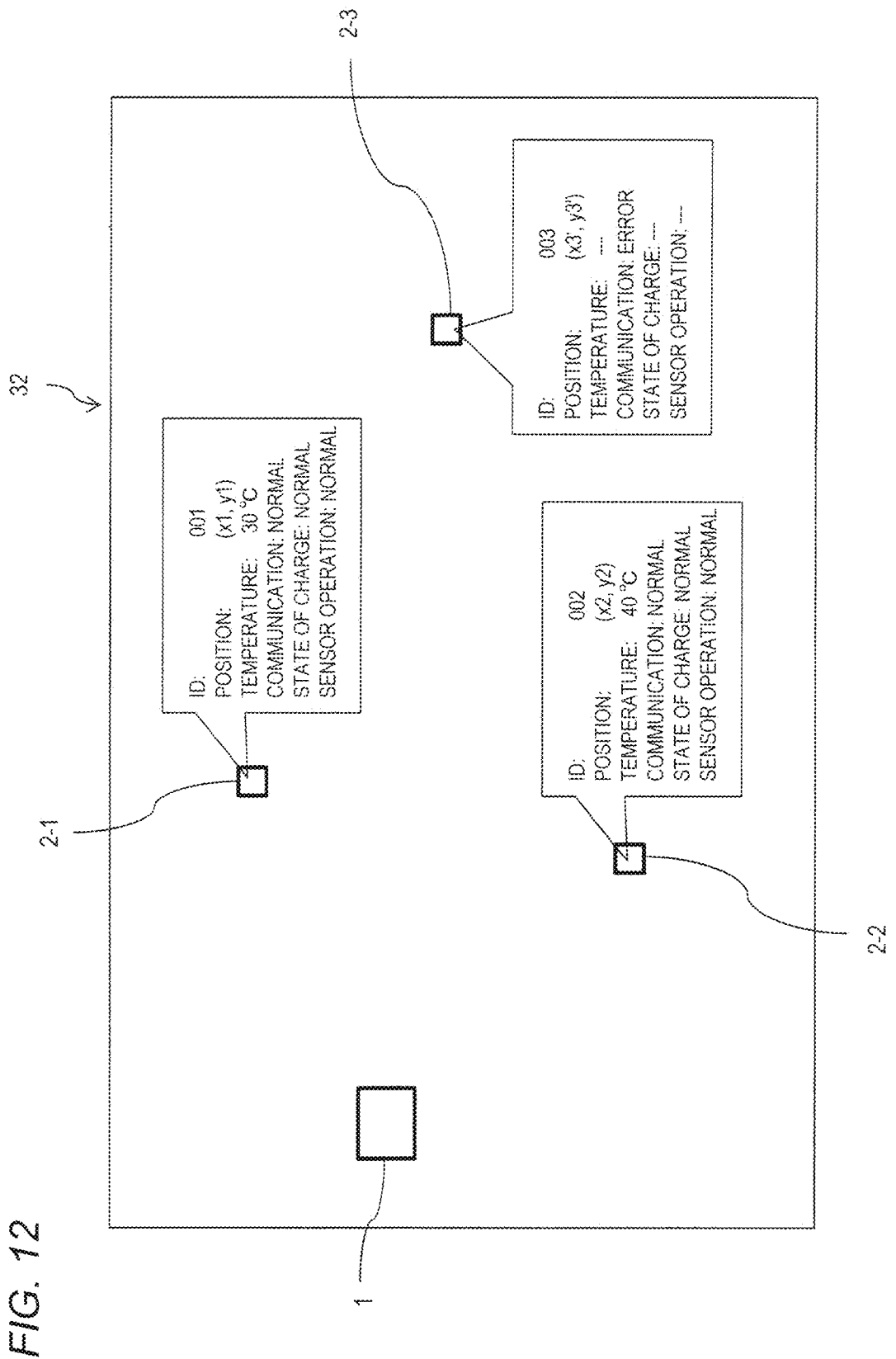
FIG. 12 is a diagram illustrating exemplary arrangement of the master apparatus 1 and the slave apparatuses 2-1 to 2-3 displayed on the display device 32 of FIG. 1, in which an error has occurred in communication between the master apparatus 1 and the slave apparatus 2-3.

FIG. 12 is a diagram illustrating exemplary arrangement of the master apparatus 1 and the slave apparatuses 2-1 to 2-3 displayed on the display device 32 of FIG. 1, in which an error has occurred in communication between the master apparatus 1 and the slave apparatus 2-3. Due to the interruption of the communication, the current position of the slave apparatus 2, the measurement value of the sensor 23, the state of charge of the rechargeable battery 21, and the state of the operation of the sensor 23 are unknown. The display device 32 displays the latest position (x3', y3') of the slave apparatus 2 read from the storage device 12 of the master apparatus 1.

Referring again to FIG. 8, in step S35, the system control circuit 30 determines whether or not an error code indicating a state-of-charge error is received; if YES, the process proceeds to step S36, and if NO, the process proceeds to step S37. In step S36, the system control circuit 30 displays the position of the slave apparatus 2, together with an error message indicating a state-of-charge error, on the display device 32.

Figure 13:
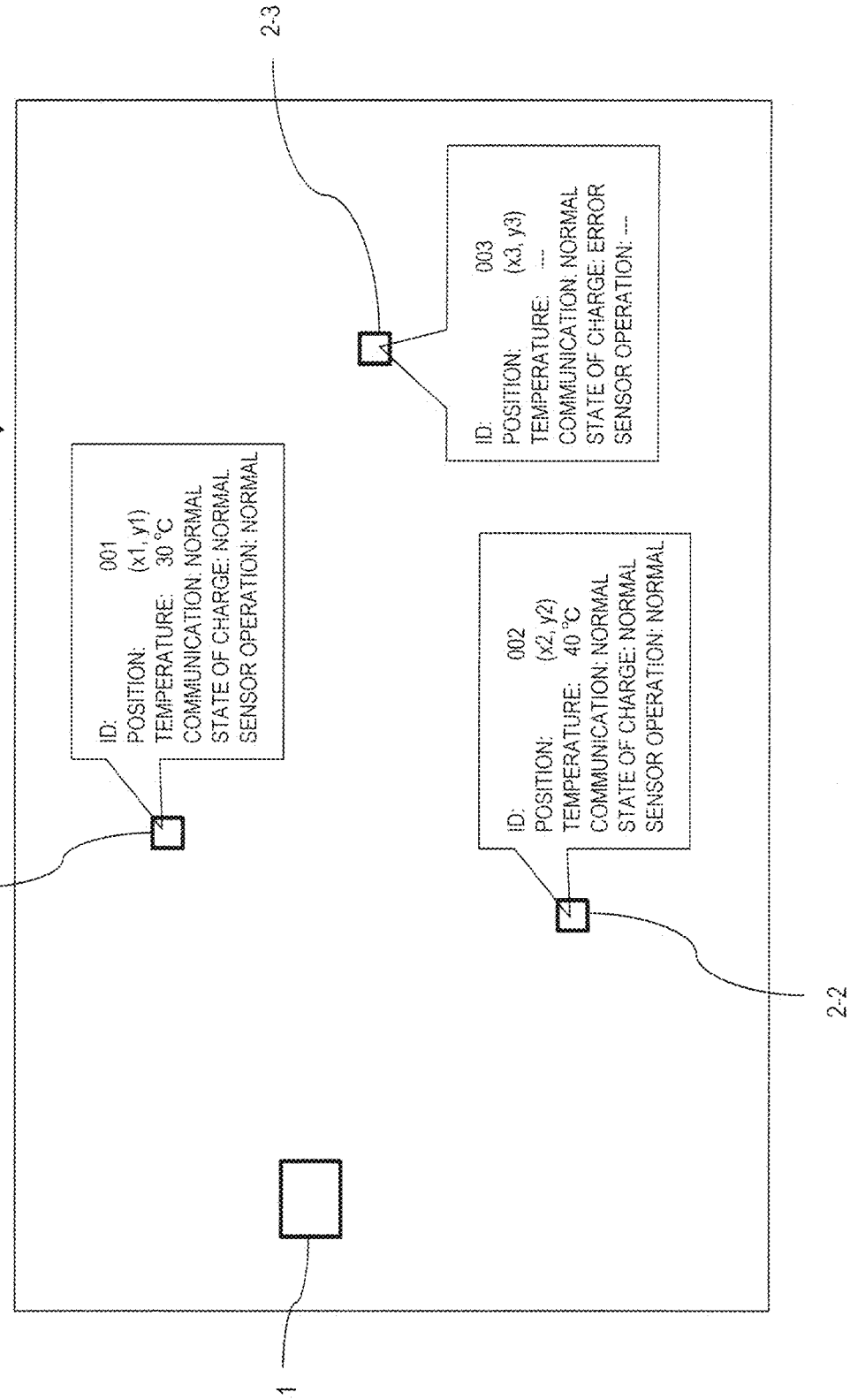
FIG. 13 is a diagram illustrating exemplary arrangement of the master apparatus 1 and the slave apparatuses 2-1 to 2-3 displayed on the display device 32 of FIG. 1, in which an error has occurred in power transmission from the master apparatus 1 to the slave apparatus 2-3.

FIG. 13 is a diagram illustrating exemplary arrangement of the master apparatus 1 and the slave apparatuses 2-1 to 2-3 displayed on the display device 32 of FIG. 1, in which an error has occurred in power transmission from the master apparatus 1 to the slave apparatus 2-3. The state of charge of the rechargeable battery 21 of the slave apparatus 2-3 becomes insufficient due to the error in power transmission. In this case, since the sensor 23 of the slave apparatus 2-3 cannot operate correctly, a correct measurement value of the sensor 23 of the slave apparatus 2-3 cannot be obtained. The display device 32 displays a dummy measurement value of the sensor 23 of the slave apparatus 2-3.

Referring again to FIG. 8, in step S37, the system control circuit 30 determines whether or not an error code indicating an error of the sensor 23 is received; if YES, the process proceeds to step S38, and if NO, the process proceeds to step S39. In step S38, the system control circuit 30 displays the position of the slave apparatus 2, and the measurement value of the sensor 23, together with an error message indicating an error of the sensor 23, on the display device 32. In step S39, the system control circuit 30 displays the position of the slave apparatus 2, and the measurement value of the sensor 23, on the display device 32.

Figure 14:
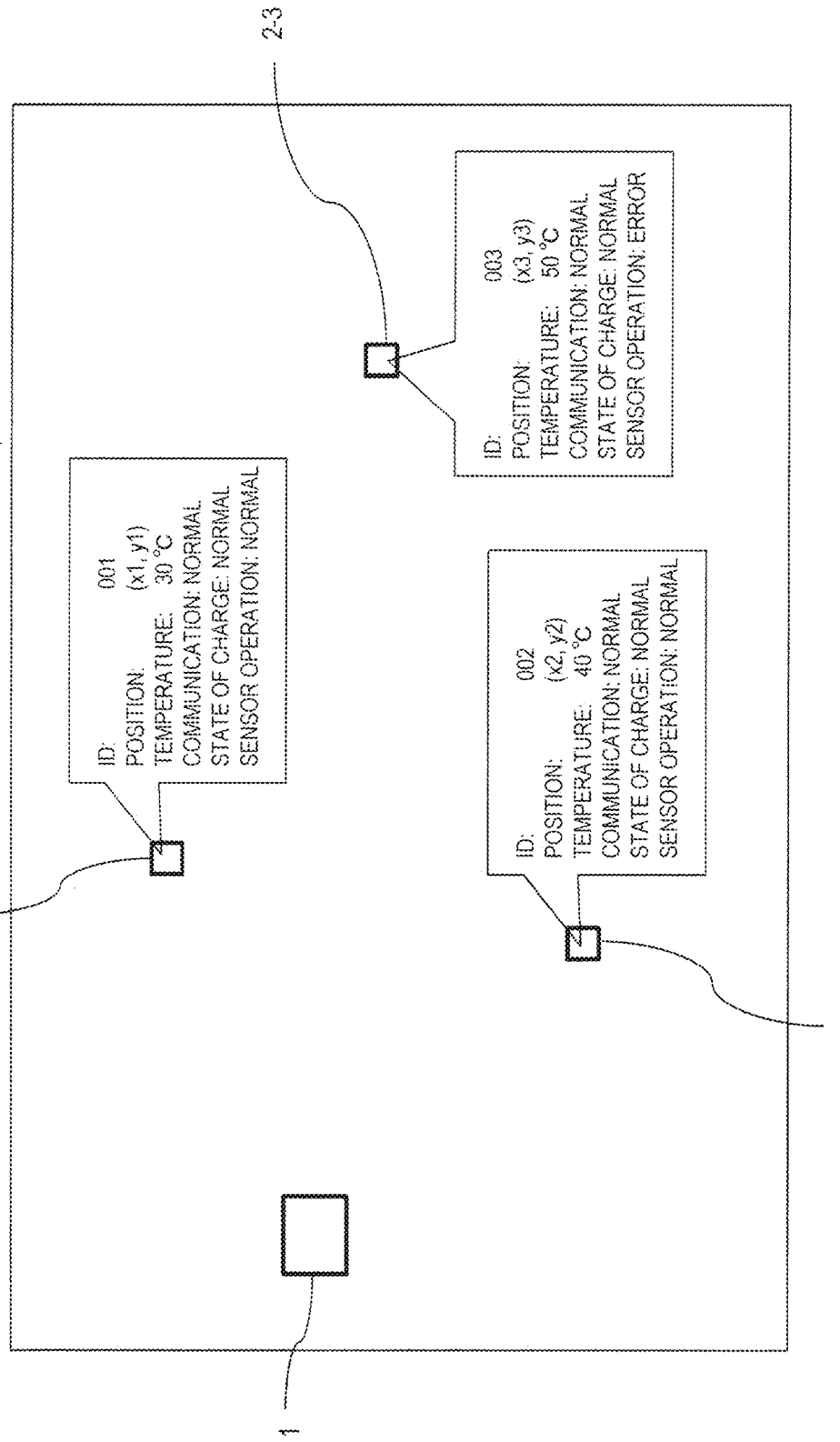
FIG. 14 is a diagram illustrating exemplary arrangement of the master apparatus 1 and the slave apparatuses 2-1 to 2-3 displayed on the display device 32 of FIG. 1, in which an error has occurred in operation of a sensor 23 of the slave apparatus 2-3.

FIG. 14 is a diagram illustrating exemplary arrangement of the master apparatus 1 and the slave apparatuses 2-1 to 2-3 displayed on the display device 32 of FIG. 1, in which an error has occurred in the operation of the sensor 23 of the slave apparatus 2-3. Malfunction occurs in the sensor 23 of the slave apparatus 2-3, but its current measurement value is considered to be equal to the correct measurement value obtained immediately before the malfunction occurs in the sensor 23. Therefore, the display device 32 displays the measurement value of the sensor 23 of the slave apparatus 2-3.

After completion of the process of FIG. 8, the system control circuit 30 may control the operations of the manufacturing apparatus 4 under the control of a user, or may periodically repeat the process of FIG. 8.

Advantageous Effects of First Embodiment

According to the wireless communication system of the first embodiment, when the master control circuit 10 fails to receive the measurement value of the sensor 23 from the slave apparatus 2, the master control circuit 10 displays, on the display device 32, the latest position stored in the storage device 12, together with an error message indicating that the communication between the master apparatus 1 and the slave apparatus 2 is interrupted. As a result, even if the current position of the slave apparatus 2 is unknown due to the interruption of the communication, it is possible to provide a user with the position where the slave apparatus 2 is considered to reside.

In addition, according to the wireless communication system of the first embodiment, when the state of charge of the rechargeable battery 21 is smaller than a predetermined threshold, the master control circuit 10 displays, on the display device 32, an error message indicating that the state of charge of the rechargeable battery 21 is low. Further, when the measurement value of the sensor 23 is unchanged for a predetermined time period, the master control circuit 10 displays, on the display device 32, an error message indicating that malfunction has occurred in the sensor 23. As a result, it can be seen that although the master apparatus 1 and the slave apparatus 2 can communicate with each other, the sensor 23 cannot obtain the measurement value due to other failures (shortage of state of charge, or malfunction of the sensor 23). Even if the measurement value of the sensor 23 is unknown, it is possible to estimate the position of the slave apparatus 2 based on the signal received by the master apparatus 1 from the slave apparatus 2.

As described above, according to the wireless communication system of the first embodiment, it is possible to appropriately monitor the conditions and position of the slave apparatus 2 to reduce the burdens of maintenance and repair.

According to the wireless communication system of the first embodiment, since the conditions and position of each of the slave apparatuses 2 can be displayed on the display device 32 in association with each other, it is possible to reduce the time and effort of maintenance and repair of the wireless communication system, and reduce the time and effort of set-up change of the manufacturing apparatus 4 and the like.

According to the wireless communication system of the first embodiment, maintenance and repair of the wireless communication system, the manufacturing apparatus 4, and others may be automated using a robot or the like operable based on the monitored conditions and position of each of the slave apparatuses 2.

According to the wireless communication system of the first embodiment, the received signals arriving at the antenna elements of the array antenna are combined with each other, and the distance between the master apparatus 1 and the slave apparatus 2 is estimated based on the signal level of the combined received signal. Therefore, it is possible to reduce the influence of the multipath, and estimate the distance with a small error.

According to the wireless communication system of the first embodiment, it is possible to integrate the system for wirelessly transmitting power from the master apparatus to the slave apparatus, with the function of detecting the position of the slave apparatus.

Second Embodiment

Figure 15:
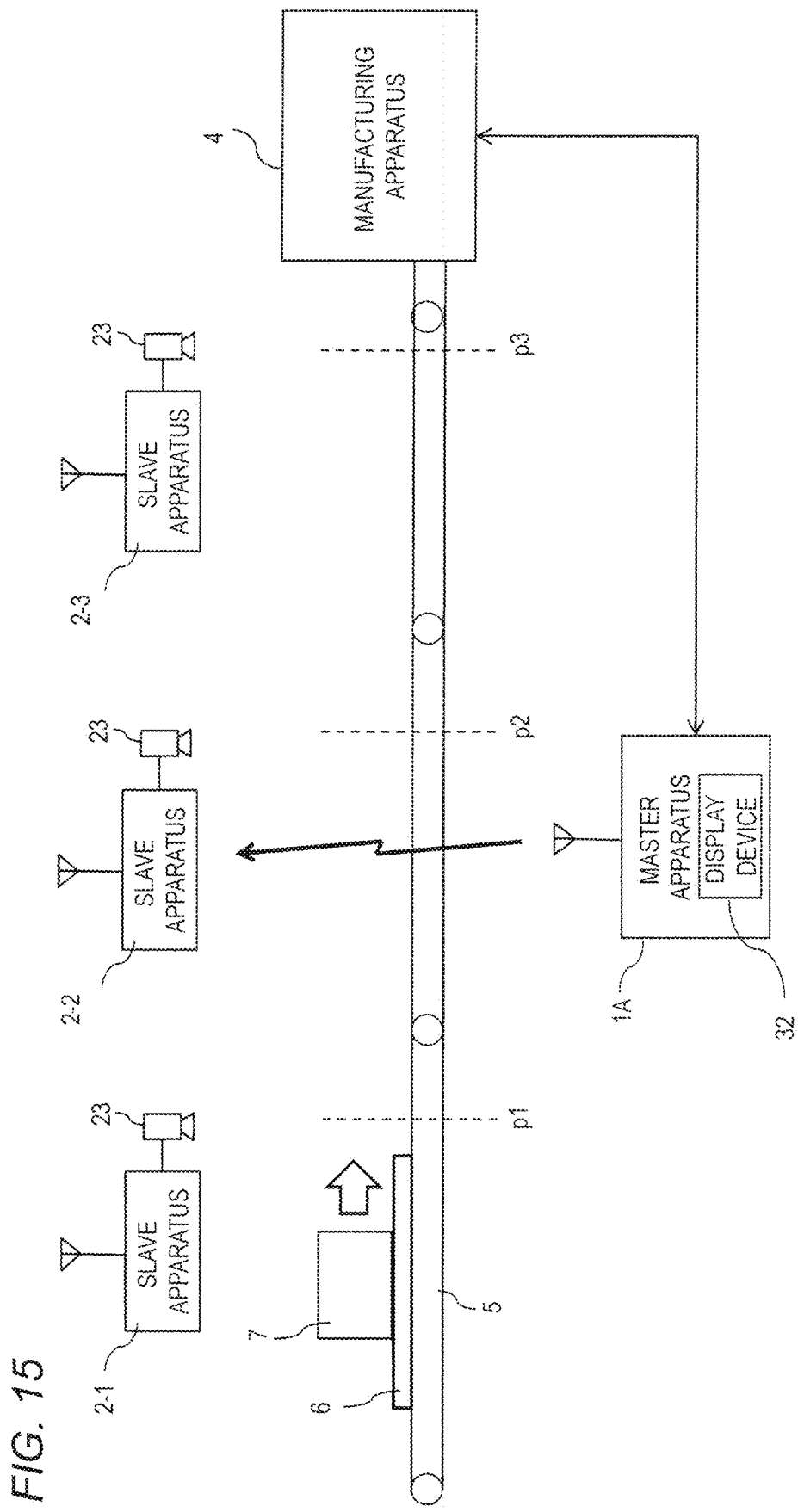
FIG. 15 is a block diagram illustrating a manufacturing system including a wireless communication system according to a second embodiment.

FIG. 15 is a block diagram illustrating a manufacturing system including a wireless communication system according to a second embodiment. The system of FIG. 15 includes a master apparatus 1A, instead of the master apparatus 1 and the manufacturing apparatus 4 of FIG. 1. The master apparatus 1A of FIG. 15 has the functions of the master apparatus 1 and the manufacturing apparatus 4 of FIG. 1, and is provided with, for example, the display device 32 of FIG. 5 and other components. The display device 32 may be integrated with the master apparatus 1A, or may be connected externally to the master apparatus 1A.

Modified Embodiments

Each of the slave apparatuses 2 may be fixed to facilities of a factory or the like. In addition, each of the slave apparatuses 2 may be a mobile apparatus attached to a robot or the body of a user.

The control apparatus 3 may control a plurality of master apparatuses 1.

The signal level monitor 17 of FIG. 2 may be integrated to the signal receiving circuit 18. In this case, the signal receiving circuit 18 may measure the signal level of the received signal.

The state of charge of the rechargeable battery 21 may be compared with a threshold by the master apparatus 1 or the slave apparatus 2. In the latter case, the slave apparatus 2 transmits the comparison result of the state of charge to the master apparatus 1.

In step S13 of FIG. 6, instead of determining whether or not the measurement value of the sensor 23 is unchanged for a predetermined time period, the master control circuit 10 may determine, for example, whether or not the measurement value of the sensor 23 is outside a predetermined range.

Summary of Embodiments

The wireless communication apparatus and the wireless communication system according to the aspects of the present disclosure may be expressed as follows.

According to the first aspect of the present disclosure, a wireless communication apparatus is operable as a master apparatus 1 for a wireless communication system including the master apparatus 1 and at least one slave apparatus 2. The slave apparatus 2 is provided with a sensor 23 configured to obtain a measurement value of a predetermined physical quantity, and the slave apparatus 2 wirelessly transmits the measurement value of the sensor 23 to the wireless communication apparatus. The wireless communication apparatus is provided with: a signal receiving circuit 18 configured to wirelessly receive the measurement value of the sensor 23 from the slave apparatus 2; a position estimator configured to estimate a position of the slave apparatus 2; a storage device 12 configured to store a history of the position of the slave apparatus 2; and a master control circuit 10 configured to display the measurement value of the sensor 23 and the position of the slave apparatus 2 on a display device 32. When the master control circuit 10 fails to receive the measurement value of the sensor 23 from the slave apparatus 2, the master control circuit 10 displays, on the display device 32, a latest position stored in the storage device 12, together with an error message indicating that communication between the wireless communication apparatus and the slave apparatus 2 is interrupted.

According to the second aspect of the present disclosure, in the wireless communication apparatus of the first aspect, the storage device 12 stores a history of the measurement value of the sensor 23. When the measurement value of the sensor 23 is unchanged for a predetermined time period, the master control circuit 10 displays, on the display device 32, an error message indicating that malfunction of the sensor 23 has occurred.

According to the third aspect of the present disclosure, in the wireless communication apparatus of the first or second aspect, the wireless communication apparatus is further provided with a power transmitting circuit 14 configured to wirelessly transmit power to the slave apparatus 2. The slave apparatus 2 is provided with a rechargeable battery 21 configured to store the power wirelessly transmitted from the wireless communication apparatus, and the slave apparatus 2 measures a state of charge of the rechargeable battery 21, and wirelessly transmits the state of charge to the wireless communication apparatus. The signal receiving circuit 18 wirelessly receives the state of charge of the rechargeable battery 21 from the slave apparatus 2. When the state of charge of the rechargeable battery 21 is smaller than a predetermined threshold, the master control circuit 10 displays, on the display device 32, an error message indicating that the state of charge of the rechargeable battery 21 is low.

According to the fourth aspect of the present disclosure, a wireless communication apparatus is operable as a master apparatus 1 for a wireless communication system including the master apparatus 1 and at least one slave apparatus 2. The slave apparatus 2 is provided with a rechargeable battery 21 storing power wirelessly transmitted from the wireless communication apparatus, measures a state of charge of the rechargeable battery 21, and wirelessly transmits the state of charge to the wireless communication apparatus. The slave apparatus 2 is provided with a sensor 23 configured to obtain a measurement value of a predetermined physical quantity, and the slave apparatus 2 wirelessly transmits the measurement value of the sensor 23 to the wireless communication apparatus. The wireless communication apparatus is provided with: a power transmitting circuit 14 configured to wirelessly transmit power to the slave apparatus 2; a signal receiving circuit 18 configured to wirelessly receive the state of charge of the rechargeable battery 21, and the measurement value of the sensor 23, from the slave apparatus 2; a position estimator configured to estimate a position of the slave apparatus 2; a storage device 12 configured to store a history of the measurement value of the sensor 23; and a master control circuit 10 configured to display the measurement value of the sensor 23, and the position of the slave apparatus 2, on a display device 32. When the state of charge of the rechargeable battery 21 is smaller than a predetermined threshold, the master control circuit 10 displays, on the display device 32, an error message indicating that the state of charge of the rechargeable battery 21 is low. When the measurement value of the sensor 23 is unchanged for a predetermined time period, the master control circuit 10 displays, on the display device 32, an error message indicating that malfunction of the sensor 23 has occurred.

According to the fifth aspect of the present disclosure, in the wireless communication apparatus of one of the first to fourth aspects, the position estimator is provided with: an antenna device ANT1 having variable directivity; and a signal level monitor 17 configured to measure a signal level of a signal wirelessly received from the slave apparatus 2.

According to the sixth aspect of the present disclosure, a wireless communication system includes: the wireless communication apparatus of one of the first to fifth aspects; and at least one slave apparatus 2.

According to the seventh aspect of the present disclosure, in the wireless communication system of the sixth aspect, the wireless communication system further includes a control apparatus 3 provided with a display device 32. The wireless communication apparatus is communicatively coupled to the control apparatus 3.

INDUSTRIAL APPLICABILITY

The wireless communication system according to the aspect of the present disclosure can be used for, for example, a sensor network including a plurality of sensors.

REFERENCE SIGNS LIST

1, 1A: MASTER APPARATUS
2-1 to 2-3: SLAVE APPARATUS
3: CONTROL APPARATUS
4: MANUFACTURING APPARATUS
5: BELT CONVEYOR
6: PALLET
7: WORKPIECE
10: MASTER CONTROL CIRCUIT
11: POWER SUPPLY DEVICE
12: STORAGE DEVICE
13: COMMUNICATION CIRCUIT
14: POWER TRANSMITTING CIRCUIT
15: SIGNAL TRANSMITTING CIRCUIT
16: ANTENNA CONTROL CIRCUIT
17: SIGNAL LEVEL MONITOR
18: SIGNAL RECEIVING CIRCUIT
19: CIRCULATOR CIRCUIT
20: SLAVE CONTROL CIRCUIT
21: RECHARGEABLE BATTERY
22: STATE-OF-CHARGE (SOC) MONITOR
23: SENSOR
24: SIGNAL TRANSMITTING CIRCUIT
25: POWER RECEIVING CIRCUIT
26: SIGNAL RECEIVING CIRCUIT
27: CIRCULATOR CIRCUIT
30: SYSTEM CONTROL CIRCUIT
31: COMMUNICATION CIRCUIT
32: DISPLAY DEVICE
41: DIVIDER
42-1 to 42-4: CIRCULATOR
43: COMBINER
51: PHASE AND AMPLITUDE ADJUSTER
52-1 to 52-4: ANTENNA ELEMENT
ANT1, ANT2: ANTENNA DEVICE

The invention claimed is:

1. A wireless communication apparatus operable as a master apparatus for a wireless communication system including the master apparatus and at least one slave apparatus,
wherein the slave apparatus comprises a sensor configured to obtain a measurement value of a predetermined physical quantity, and the slave apparatus wirelessly transmits the measurement value of the sensor to the wireless communication apparatus,
wherein the wireless communication apparatus comprises:
a signal receiving circuit configured to wirelessly receive the measurement value of the sensor from the slave apparatus;
a position estimator configured to estimate a position of the slave apparatus;
a storage device configured to store a history of the position of the slave apparatus; and
a master control circuit configured to display the measurement value of the sensor and the position of the slave apparatus on a display device,
wherein, when the master control circuit fails to receive the measurement value of the sensor from the slave apparatus, the master control circuit displays, on the display device, a latest position stored in the storage device, together with an error message indicating that communication between the wireless communication apparatus and the slave apparatus is interrupted, and
wherein the storage device stores a history of the measurement value of the sensor, and
wherein, when the measurement value of the sensor is unchanged for a predetermined time period, the master control circuit displays, on the display device, an error message indicating that malfunction of the sensor has occurred.

2. The wireless communication apparatus as claimed in claim 1,
wherein the wireless communication apparatus further comprises a power transmitting circuit configured to wirelessly transmit power to the slave apparatus,
wherein the slave apparatus comprises a rechargeable battery configured to store the power wirelessly transmitted from the wireless communication apparatus, and the slave apparatus measures a state of charge of the rechargeable battery, and wirelessly transmits the state of charge to the wireless communication apparatus,
wherein the signal receiving circuit wirelessly receives the state of charge of the rechargeable battery from the slave apparatus, and
wherein, when the state of charge of the rechargeable battery is smaller than a predetermined threshold, the master control circuit displays, on the display device, an error message indicating that the state of charge of the rechargeable battery is low.

3. A wireless communication apparatus operable as a master apparatus for a wireless communication system including the master apparatus and at least one slave apparatus,
wherein the slave apparatus comprises a rechargeable battery storing power wirelessly transmitted from the wireless communication apparatus, measures a state of charge of the rechargeable battery, and wirelessly transmits the state of charge to the wireless communication apparatus,
wherein the slave apparatus comprises a sensor configured to obtain a measurement value of a predetermined physical quantity, and the slave apparatus wirelessly transmits the measurement value of the sensor to the wireless communication apparatus,
wherein the wireless communication apparatus comprises:
a power transmitting circuit configured to wirelessly transmit power to the slave apparatus;
a signal receiving circuit configured to wirelessly receive the state of charge of the rechargeable battery, and the measurement value of the sensor, from the slave apparatus;
a position estimator configured to estimate a position of the slave apparatus;
a storage device configured to store a history of the measurement value of the sensor; and
a master control circuit configured to display the measurement value of the sensor, and the position of the slave apparatus, on a display device,
wherein, when the state of charge of the rechargeable battery is smaller than a predetermined threshold, the master control circuit displays, on the display device, an error message indicating that the state of charge of the rechargeable battery is low, and
wherein, when the measurement value of the sensor is unchanged for a predetermined time period, the master control circuit displays, on the display device, an error message indicating that malfunction of the sensor has occurred.

4. The wireless communication apparatus according to claim 1,
wherein the position estimator comprises:
an antenna device having variable directivity; and
a signal level monitor configured to measure a signal level of a signal wirelessly received from the slave apparatus.

5. A wireless communication system including:
a wireless communication apparatus; and
at least one slave apparatus,
wherein the slave apparatus comprises a sensor configured to obtain a measurement value of a predetermined physical quantity, and the slave apparatus wirelessly transmits the measurement value of the sensor to the wireless communication apparatus,
wherein the wireless communication apparatus comprises:
a signal receiving circuit configured to wirelessly receive the measurement value of the sensor from the slave apparatus;
a position estimator configured to estimate a position of the slave apparatus;
a storage device configured to store a history of the position of the slave apparatus; and
a master control circuit configured to display the measurement value of the sensor and the position of the slave apparatus on a display device,
wherein, when the master control circuit fails to receive the measurement value of the sensor from the slave apparatus, the master control circuit displays, on the display device, a latest position stored in the storage device, together with an error message indicating that communication between the wireless communication apparatus and the slave apparatus is interrupted, and
wherein the storage device stores a history of the measurement value of the sensor, and
wherein, when the measurement value of the sensor is unchanged for a predetermined time period, the master control circuit displays, on the display device, an error message indicating that malfunction of the sensor has occurred.

6. The wireless communication system as claimed in claim 5,
wherein the wireless communication system further includes a control apparatus comprising a display device, and
wherein the wireless communication apparatus is communicatively coupled to the control apparatus.

* * * * *